(12) United States Patent
Sajovic

(10) Patent No.: US 11,535,123 B2
(45) Date of Patent: Dec. 27, 2022

(54) VEHICULAR CHILD MONITORING SYSTEM

(71) Applicant: Jason Edward Sajovic, Apopka, FL (US)

(72) Inventor: Jason Edward Sajovic, Apopka, FL (US)

(*) Notice: Subject to any disclaimer, the term of this patent is extended or adjusted under 35 U.S.C. 154(b) by 0 days.

(21) Appl. No.: 17/152,493

(22) Filed: Jan. 19, 2021

(65) Prior Publication Data
US 2022/0227259 A1 Jul. 21, 2022

(51) Int. Cl.
| B60Q 1/00 | (2006.01) |
| B60N 2/00 | (2006.01) |
| G08B 21/02 | (2006.01) |
| G08B 21/22 | (2006.01) |
| B60N 2/26 | (2006.01) |
| G08B 21/24 | (2006.01) |
| G06V 20/59 | (2022.01) |

(52) U.S. Cl.
CPC ............... *B60N 2/002* (2013.01); *B60N 2/26* (2013.01); *G06V 20/593* (2022.01); *G08B 21/0247* (2013.01); *G08B 21/0255* (2013.01); *G08B 21/0277* (2013.01); *G08B 21/22* (2013.01); *G08B 21/24* (2013.01)

(58) Field of Classification Search
CPC .......... B60N 2/002; B60N 2/26; G08B 21/24; G08B 21/0255; G08B 21/0247; G08B 21/0277; G08B 21/22; G06K 9/00838; G06V 20/593

USPC ................ 340/457, 573.1, 573.4, 521, 686.6
See application file for complete search history.

(56) References Cited

U.S. PATENT DOCUMENTS

| 2009/0174774 A1* | 7/2009 | Kinsley | B60R 1/00 348/148 |
| 2013/0049955 A1* | 2/2013 | Hoover | B60N 2/28 340/539.11 |
| 2014/0118548 A1* | 5/2014 | Veneziano | H04N 5/2256 348/148 |
| 2016/0379459 A1* | 12/2016 | Trang | G08B 21/24 340/457 |
| 2017/0109987 A1* | 4/2017 | Auvenshine | B60R 21/01544 |
| 2020/0193792 A1* | 6/2020 | Mao | G10L 13/00 |
| 2021/0046898 A1* | 2/2021 | Walker | H04N 5/28 |

* cited by examiner

*Primary Examiner* — Anh V La
(74) *Attorney, Agent, or Firm* — Jason T. Daniel, Esq.; Daniel Law Offices, P.A.

(57) ABSTRACT

A vehicular child monitoring system includes a child monitoring device having a connector for securing the device within a motor vehicle and oriented toward a child seat. The device including a mirror, a seat connector, a camera, and a controller having a wireless communication unit and a plurality of sensors. The sensors include a temperature sensor, a humidity sensor, a proximity sensor, and a child detection sensor. A child monitoring application is communicatively linked to the communication unit and includes functionality for displaying the information received from the camera and each of the sensors, and for determining a separation distance with the child monitoring device. The system including functionality for determining that a child is in the car seat, and that a separation distance is beyond a predetermined threshold and activating an alarm protocol.

20 Claims, 4 Drawing Sheets

VEHICULAR CHILD MONITORING SYSTEM

TECHNICAL FIELD

The present invention relates generally to child safety products, and more particularly to a device and system for monitoring the presence of a child in a vehicle.

BACKGROUND

The statements in this section merely provide background information related to the present disclosure and may not constitute prior art.

As any parent will attest, there is nothing more important than the safety of a child. Unfortunately, thousands of children are unintentionally left within parked vehicles each year by parents or other caregivers after arriving at a destination. These instances have resulted in serious injuries and numerous child deaths caused by the effects of prolonged exposure to extreme temperatures within the parked vehicle. In the vast majority of such instances, the caregiver (who is often a new parent) simply forgot that the child was in the vehicle.

Although there are many commercially available child seats such as infant carriers and booster seats, for example, these items are specifically designed to meet or exceed safety standards so as to give a child the best possible chance of surviving a crash. As a result, they often surround the child, making it difficult for the caregiver to physically see the child in their seat. Unfortunately, such seats do nothing to prevent a child from being left in the vehicle after arriving at a destination.

Accordingly, it would be beneficial to provide a vehicular child monitoring device that can allow a caregiver to quickly and easily see a child riding in their vehicle at all times. It would also be beneficial if the device can provide an alert/alarm in the instance the caregiver leaves the child unattended within the vehicle.

SUMMARY OF THE INVENTION

The present invention is directed to a vehicular child monitoring system. One embodiment of the present invention can include a child monitoring device that is positioned within a motor vehicle and oriented toward a child seat. The device can include a mirror, a seat connector, a camera, and a controller having a wireless communication unit and a plurality of sensors. The sensors can include a temperature sensor, a humidity sensor, a proximity sensor, and a child detection sensor.

In one embodiment, data from the camera and each of the sensors can be transmitted to an external device that is running a child monitoring application. The application including functionality for displaying the information received from the camera and each of the sensors, and for determining a separation distance with the child monitoring device.

In one embodiment, the system can initiate an alarm protocol upon determining that a child is in the car seat, and that the separation distance is beyond a predetermined threshold. The alarm protocol can include providing an audiovisual notification on the external device and selectively contacting third parties via a cellular connection.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
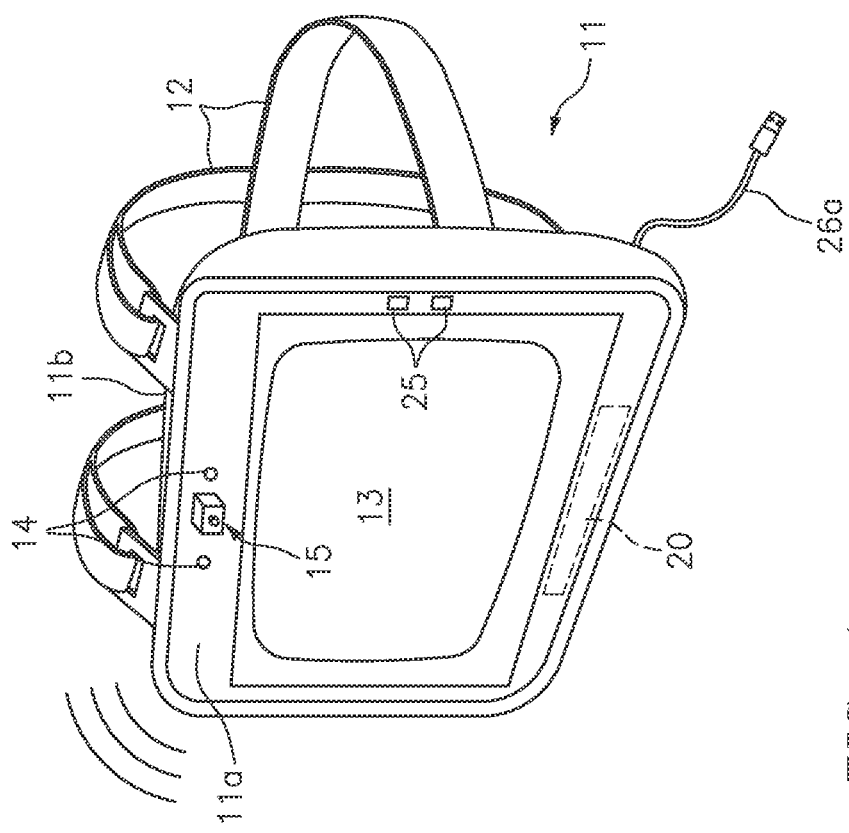
FIG. 1 is a perspective view of a vehicular child monitoring system, in accordance with one embodiment of the invention.
Figure 1:
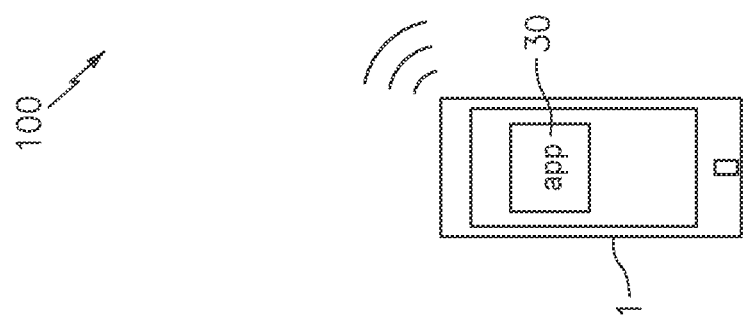

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described herein, the term "connector" includes any number of different elements that work together to repeatedly join two items together in a nonpermanent manner. Several nonlimiting examples include opposing strips of hook and loop material (i.e. Velcro®), attractively-oriented magnetic elements, flexible strips of interlocking projections with a slider (i.e., zipper), tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-3B illustrate one embodiment of a vehicular child monitoring system 10 that is useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in FIG. 1, one embodiment of the system 10 can include, essentially, a child monitoring device 11 having an internally located system controller 20 that is in communication with a user interface 1 running an application 30.

In one embodiment, the child monitoring device can include a main body 11 having front surface 11a, a back surface 11b and a plurality of side surfaces that define an interior space. In one embodiment, the main body can include the illustrated rectangular shape, and can be constructed from plastic having a foam cover.

Although not specifically illustrated, the main body may include or be adorned with any number of decorative elements such as various drawings, logos, words and/or colors, for example, which can be provided to make the unit attractive for parents and children. Of course, other embodiments are contemplated wherein the main body can be constructed so as to include any number of different shapes and sizes and can be constructed from a wide variety of different materials than those described above.

In one embodiment, a seat connector 12 can be disposed along the back surface of the main body 11. In the illustrated embodiment, the seat connector can include a plurality of adjustable straps for allowing the main body to be removably secured onto a headrest of a vehicle seat. Of course, any number of other connectors capable of securing the main body at any location along or within a vehicle are also contemplated.

In one embodiment, a mirror 13 can be positioned along the front of the main body 11. In the preferred embodiment, the mirror will be constructed from a shatter proof material such as acrylic or polished metal, for example. The mirror can also include a wide variety of different shapes and sizes and can also include different magnification levels.

In one embodiment, one or more lights 14 can be provided along the front of the main body. The light can be communicatively linked to the system controller 20, and can function to selectively illuminate the mirror 13 and/or a child to which the main body is oriented. In the preferred embodiment, the light can comprise a low voltage light emitting diode; however, any number of other types of lighting elements are contemplated.

In one embodiment, a camera 15 can be positioned along the front surface of the main body 11. As described herein, the camera 15 can include any type of image capture device capable of capturing still or moving images in any one of the visible, near-infrared, or any appropriate spectrum. The camera may include an integrated microphone, so as to capture audiovisual information which can be transmitted to the system controller for storage within the memory and/or transmission by the transceiver.

Figure 2:
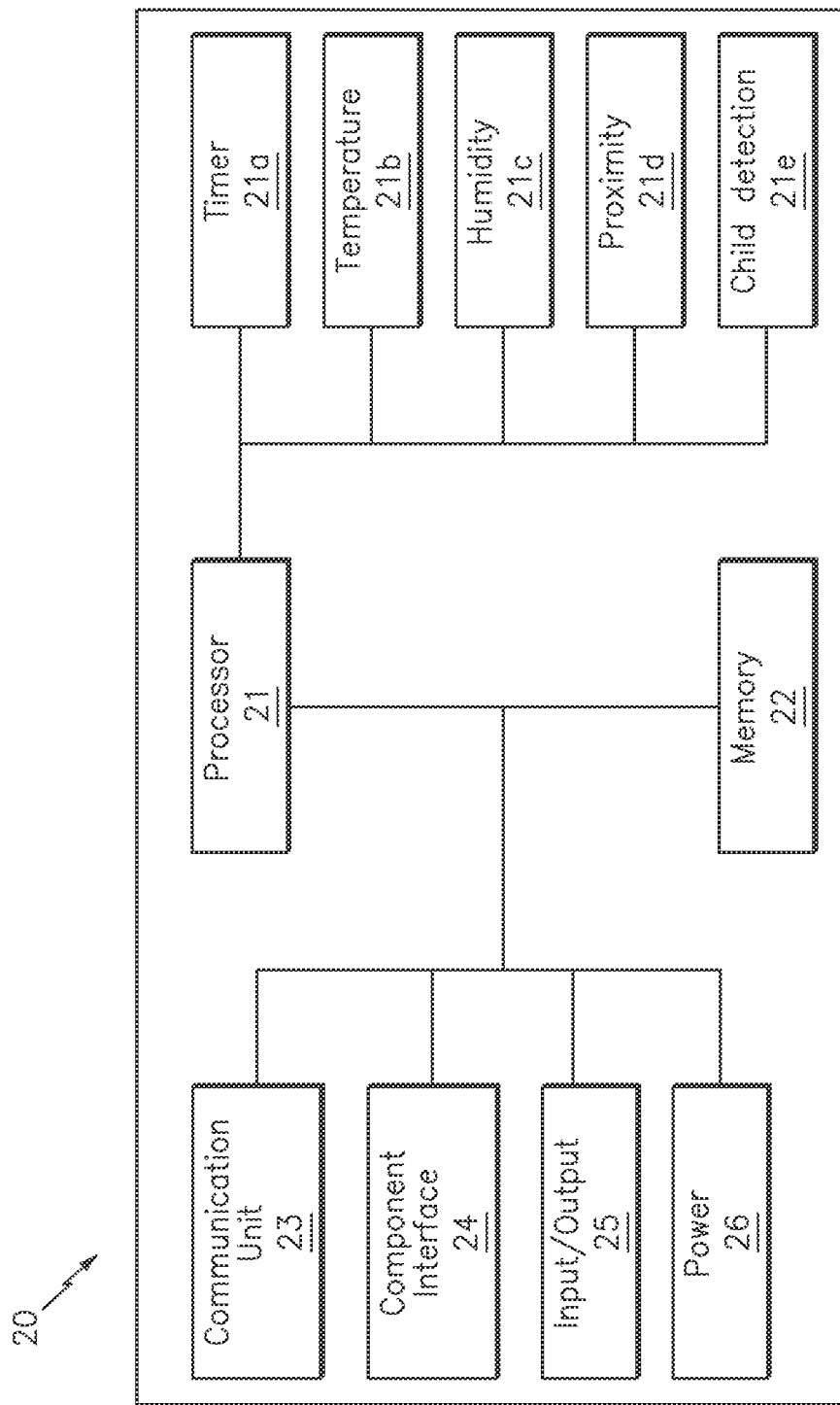
FIG. 2 is a simplified block diagram of the internal controller of the vehicular child monitoring device, in accordance with one embodiment of the invention.

FIG. 2 illustrates one embodiment of the controller 20 for the system 10. As shown, the controller can include a processor 21 that is conventionally connected to an internal memory 22, a communication unit 23, a component interface unit 24 an input/output unit 25, and/or a power source 26.

Although illustrated as separate elements, those of skill in the art will recognize that one or more system components may comprise, or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The processing unit 21 can be a conventional central processing unit (CPU) or any other type of device, or multiple devices, capable of manipulating or processing information such as program code stored in the memory 22 and for causing the circuitry to complete the activities and functionality described herein.

In various embodiments, one or more sensors can be provided as a part of the controller. Several such sensors may include, for example, a timer 21a, a temperature sensor 21b, a humidity sensor 21c, a proximity sensor 21d, and a child detection sensor 21e among others for example. As described herein, each of these sensors can be provided as a function of the processor or can include a separate physical circuit.

With specific regard to the proximity sensor 21d, this component can preferably function to continuously detect and report the strength and time intervals of the signals passed between the device 11 and a mobile device 1 running the below described App 30, in order to calculate a separation distance of the components.

As described herein, the child detection sensor 21e can include any number of different devices capable of detecting the presence of a child. In one embodiment, the sensor can include an infrared motion sensor which can detect movement within a 180-degree area. In another embodiment, the memory may be provided with instructions to utilize images captured by the camera to perform facial or spatial recognition.

Memory 22 can act to store operating instructions in the form of program code for the processor 21 to execute. Although illustrated in FIG. 2 as a single component, memory 22 can include one or more physical memory devices such as, for example, local memory and/or one or more bulk storage devices. To this end, the controller memory can also function to receive and store audiovisual information from the camera 15.

The communication unit 23 can include any number of components capable of sending and/or receiving electronic signals with an externally located device, either directly or over a network. In one embodiment, the communication unit can include a WiFi transceiver for communicating wirelessly with an external device 1 such as a smartphone, computer and/or tablet device running a mobile application. Such a feature allowing a user within the vehicle to continuously view information captured by the camera and other sensors.

In the preferred embodiment, the system 10 can include a child monitoring application (i.e., App) 30 which can be loaded onto the portable electronic device 1. Of course, the inventive concepts disclosed herein are not to be construed as limiting to a smartphone App, as virtually any type of instruction sets, in any form of programming language that can be executed on a processor enabled device are also contemplated.

In one embodiment, the communication unit 23 can include a cellular transceiver capable of sending and receiving voice and/or data transmissions over a cellular network. Such a feature allowing the system to perform each of the above noted tasks, and to also directly notify third parties by voice, text or data transmission, in the event the system detects the child is left unoccupied within a vehicle. Of course, the communication unit is not limited to the above, as any number of other known transmission and reception mechanisms and protocols can also be utilized herein, several nonlimiting examples include Near-Field-Communication (NFC) devices, unique radio frequencies and/or a network adapter functioning to communicate over a WAN, LAN or the internet via an internet service provider.

The internal component interface unit 24 can function to provide a communicative link between the processor 21 and various other device components such as the camera 15, lights 14, and/or onboard sensors (e.g., temperature sensor, humidity sensor and proximity sensor), for example. In this regard, the component interface unit can include any number of different components such as one or more PIC microcontrollers, internal bus, USB connections and other such hardware capable of providing a direct link between the various components. Of course, any other means for providing the two-way communication between various system components can also be utilized herein.

One or more input/output units, such as the push buttons 25 can act to accept user inputs and provide instructions to the processor. In one preferred embodiment, each of the button(s) can be connected to the processor 21 so as to activate different programmatic functions. For example, the push button can act to initiate programming for instructing the processor 21 to immediately activate the lights 14. In another example, one of the buttons 25 can function to switch the electronic components of the device between an ON and OFF state, initiate a Sleep mode, and/or to pair the communication unit with an external device, and so on.

In the preferred embodiment, the power source 26 can include one or more DC batteries capable of providing the necessary power requirements to each element of the device 10. In one embodiment, the batteries can be located within the main body and can be rechargeable in nature via a charging port/cord 26a, such as a mini or micro USB port, for example. Likewise, the charging cord can function to supply continuous power to the device if so desired. Of course, traditional batteries can also be utilized, and the main body can further include a battery compartment having a removable cover (not illustrated) for allowing a user to access the same.

Figure 3A:
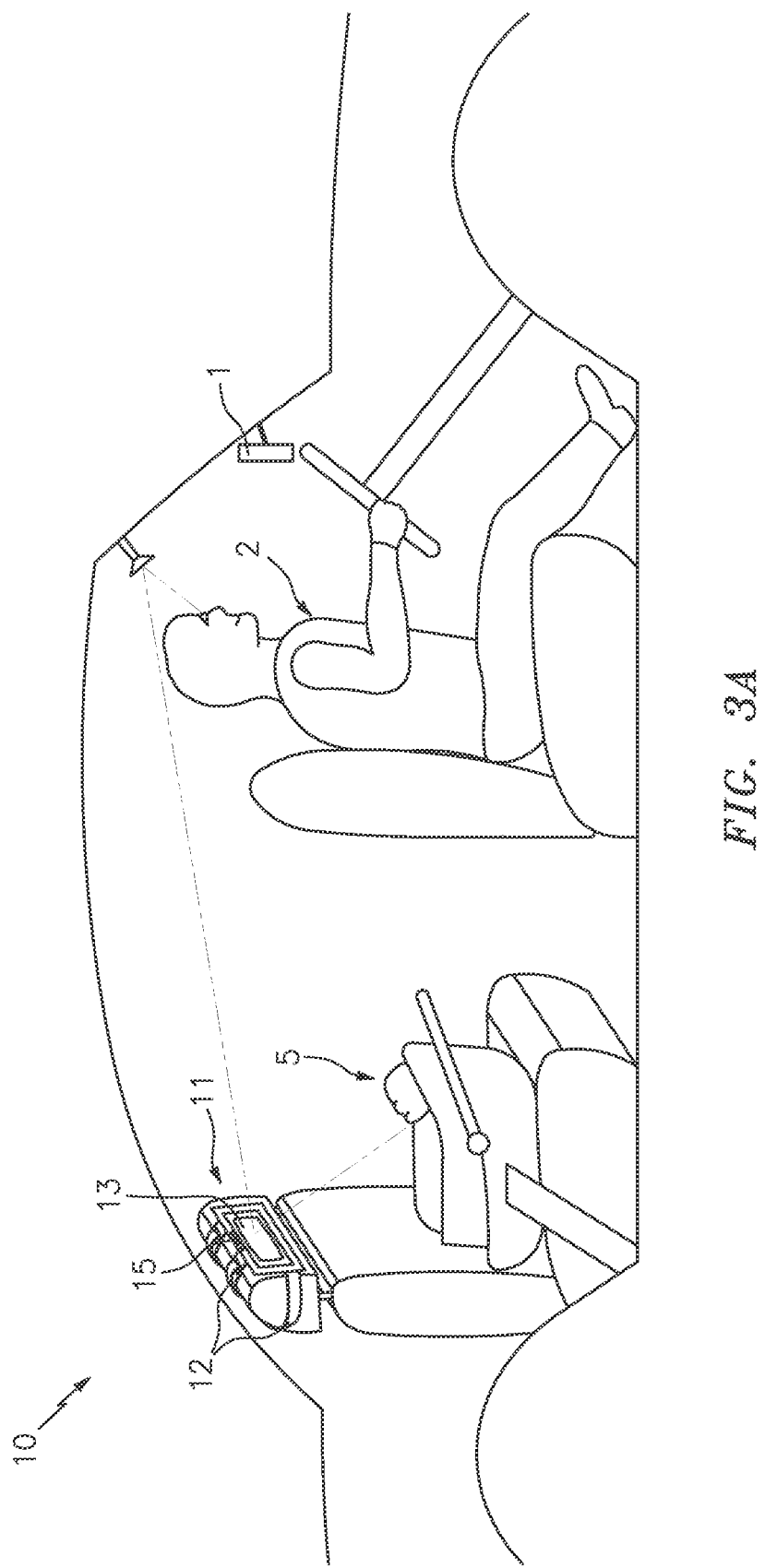
FIG. 3A is a perspective view of the vehicular child monitoring system in operation, in accordance with one embodiment of the invention.
Figure 3B:
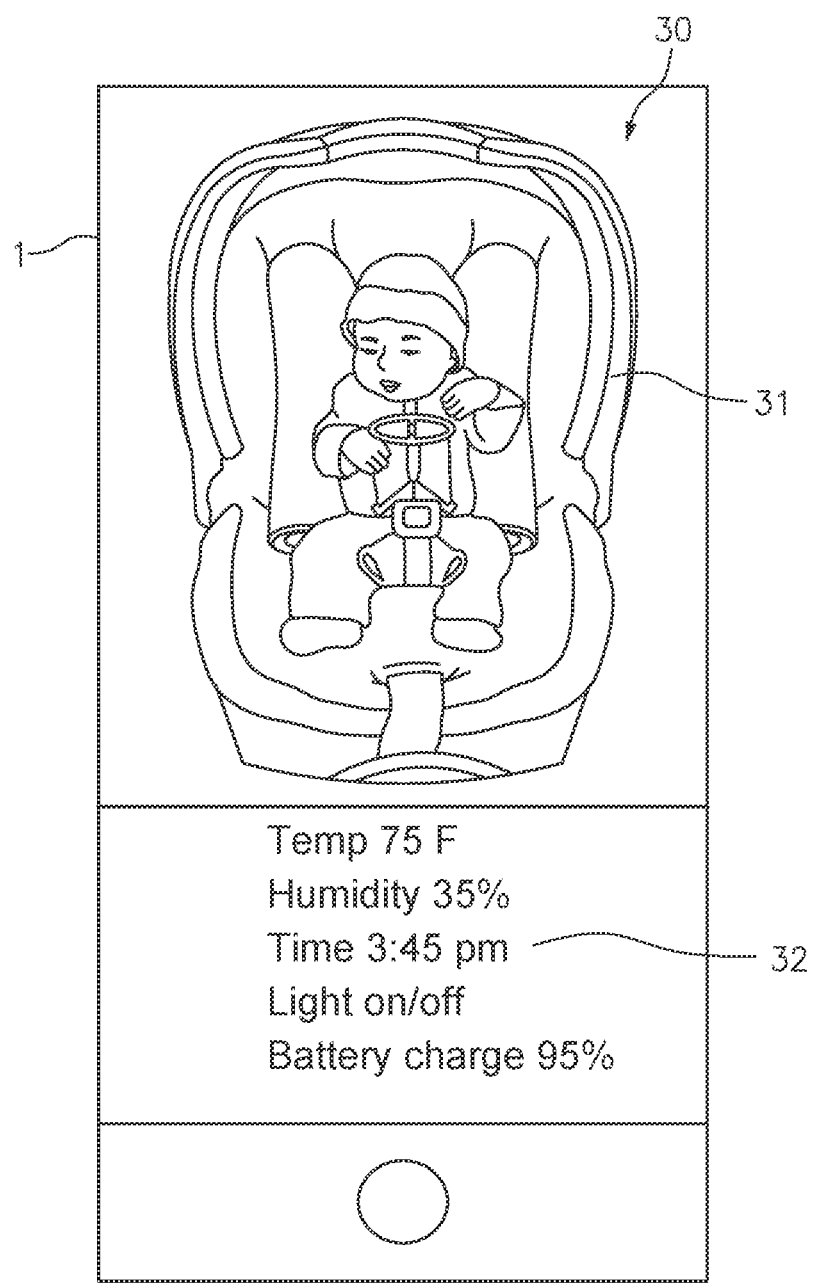
FIG. 3B is an exemplary presentation screen generated by the child monitoring application, in accordance with one embodiment of the invention.

FIGS. 3A and 3B illustrate one embodiment of the system 10 in operation. As shown, a user 2 can use the connectors 12 to position the device 11 along a vehicle seat such that the camera 15 and mirror 13 are pointed toward a child 2 in a car seat. Next, the user can activate the mobile app 30 on their device 1 and can use both the camera 15 and mirror 13 to continuously monitor the health and safety of a child within the seat.

In one embodiment, the App 30 can include program language for execution on the device 1 that enables an App user to send and/or receive information with the child monitoring device 11. This information can include, for example, instructions to selectively activate the camera 15 and/or lights 14 of the device 11. Additionally, the App 30 can include functionality for displaying the audiovisual information captured by the camera 15 in order to show a live image 31 of the child 1, along with the sensor data 32 such as the current temperature and humidity levels of the vehicle in which the child and device 11 are presently located.

In various embodiments, information sent from the device 11 can be transmitted directly to the device 1 for immediate viewing and/or storage by the device 1's local memory, or the information can be sent to a centralized server for storage in the cloud. In such a situation, additional authorized and verified users operating secondary devices with the App 30 installed thereon may be able to view the information as well. For example, both parents of the child can install the App 30 on their personal smartphone devices so as to be able to view the camera and sensor information when they are in the vehicle with the child and when the other parent is in the vehicle with the child.

Another operation of the system 100 can include the ability to initiate an alarm protocol when the system detects that the child may have been left unattended within the vehicle. In various embodiments, this can be accomplished by first detecting the presence of a child via the child detection sensor 21e, and subsequently determining that the distance between the device 11 and the device 1 on which the App 30 is operating has exceeded a predetermined distance such as 15 feet, for example. Such a distance representing a high likelihood that the device holder has vacated the vehicle while the child remains with the vehicle.

In one embodiment, the proximity sensor 21e can measure the signal strength of the received WiFi (or other signals) emanating from the device 1 on which the app 30 is located. For example, the communication unit 23 can be programmed to automatically transmit a connection signal to the app 30 or vice versa at specified intervals. Upon receiving the connection signal, the corresponding device 23 or 30 can be programmed to immediately send a response signal. When the response time to receive the response signal exceeds a calculated value amount or when the response signal strength is below a calculated value amount, the device 11 can determine that the user of the device 1 has exceeded the specified distance, and is thus likely no longer in the vehicle.

Of course, the inventive concepts are not to be construed as limiting to the above noted means for determining the separation distance, as any number of other devices and methods can be utilized herein to make the determination. For example, if the communication unit 23 includes a cellular transceiver, separation distance between the device 11 and the user device 1 can be determined by using the cellular tower triangulation and/or other known forms of cellular location tracking such as GPS, for example.

In various embodiments, the alarm protocol may include initiating the speaker and lights of both the user device 1 and the child monitoring device 11 to immediately notify the device user and/or anyone nearby that a child has been left in the vehicle. In the event that the user of the device 1 does not respond, or in the event that the temperature within the vehicle is beyond a predetermined threshold (e.g., 99° F.), or upon other occurrences, the system may also automatically place a call to a list of contacts and/or the authorities. In such an embodiment, the cellular transceiver can provide the location of the device 11 using cellular GPS, so that first responders may be able to quickly identify the location of the child.

Although described above with regard to a user-operated device 1, other embodiments of the system 10 are contemplated wherein the system may include a dedicated purpose-build device having the above described communicative abilities and video screen. Additionally, the system 10 may include a vehicle communication module, such as a CAN module, in order to allow a vehicle operator to view the camera information on the vehicle display screen. In such an embodiment, the vehicle's headlights and horn may become activated upon initiation of the alarm protocol.

As described herein, one or more elements of the child monitoring device 11 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A vehicular child monitoring system, comprising:
a child monitoring application that includes machine readable instructions for execution on an external processor enabled device having a speaker, internet connectivity, and a display screen; and
a child monitoring device that includes a main body having a front surface, a back surface and an inside space,
a mirror that is positioned along the front surface of the main body and oriented in a first direction,
a seat connector,
a camera that is positioned along the front surface of the main body,
a child detection sensor that is positioned along the main body, said child detection sensor comprising a non-contact movement sensor that functions to detect a presence of a child located in the first direction, and
a controller that is positioned within the inside space of the main body, said controller being communicatively linked to the camera and the child detection sensor, and including functionality for communicating wirelessly with the child monitoring application.

2. The system of claim 1, wherein the child monitoring application includes functionality for selectively activating the camera of the child monitoring device.

3. The system of claim 2, wherein the child monitoring application includes functionality for displaying audiovisual information captured by the camera on the display screen of the external processor enabled device.

4. The system of claim 1, further comprising:
at least one light that is disposed along the main body of the child monitoring device.

5. The system of claim 4, wherein the child monitoring application includes functionality for selectively activating each of the at least one light on the child monitoring device.

6. The system of claim 1, wherein the controller includes:
a memory;
a wireless communication unit; and
a processor that is in communication with the memory and the wireless communication unit.

7. The system of claim 6, wherein the memory is configured to receive and store audiovisual information captured by the camera.

8. The system of claim 6, wherein the wireless communication unit includes at least one of a WiFi transceiver or a Bluetooth transceiver.

9. The system of claim 6, further comprising:
a proximity sensor that is configured to measure a strength of a signal received from the wireless communication unit.

10. The system of claim 9, wherein the signal strength of the received signal is calculated to determine a separation distance between the child monitoring device and the external processor enabled device running the child monitoring application.

11. The system of claim 9, wherein the controller includes functionality for initiating an alarm protocol when a separation distance between the child monitoring device and the external processor enabled device running the child monitoring application is beyond a predetermined threshold.

12. The system of claim 11, wherein the alarm protocol includes activating the speaker of the external processor enabled device.

13. The system of claim 11, wherein the alarm protocol includes simultaneously activating the speaker of the external processor enabled device, and a speaker located on the child monitoring device.

14. The system of claim 1, wherein the non-contact movement sensor comprises an infrared motion sensor.

15. The system of claim 1, further comprising:
a temperature sensor that is positioned along the main body.

16. The system of claim 15, wherein the child monitoring application includes functionality for simultaneously displaying a temperature reading from the temperature sensor and audiovisual information captured by the camera on the display screen of the external processor enabled device.

17. The system of claim 15, further comprising:
a controller that is positioned within the main body, said controller including functionality for initiating an alarm protocol when a temperature detected by the temperature sensor is beyond a predetermined temperature,
wherein the alarm protocol includes activating the speaker of the external processor enabled device.

18. The system of claim 15, further comprising:
a controller that is positioned within the main body, said controller including functionality for initiating an alarm protocol when a temperature detected by the temperature sensor is beyond a predetermined temperature,
wherein the alarm protocol includes simultaneously activating the speaker of the external processor enabled device, and a speaker located on the child monitoring device.

19. The system of claim 15, further comprising:
a controller that is positioned within the main body, said controller including functionality for initiating an alarm protocol when a separation distance between the child monitoring device and the external processor enabled device running the child monitoring application is beyond a predetermined threshold, or when a temperature detected by the temperature sensor is beyond a predetermined temperature,
wherein the alarm protocol includes activating the speaker of the external processor enabled device.

20. The system of claim 16, further comprising:
a controller that is positioned within the main body, said controller including functionality for initiating an alarm protocol when a separation distance between the child monitoring device and the external processor enabled device running the child monitoring application is beyond a predetermined threshold, or when a temperature detected by the temperature sensor is beyond a predetermined temperature,
wherein the alarm protocol includes simultaneously activating the speaker of the external processor enabled device, and a speaker located on the child monitoring device.

* * * * *